Patented Oct. 30, 1945

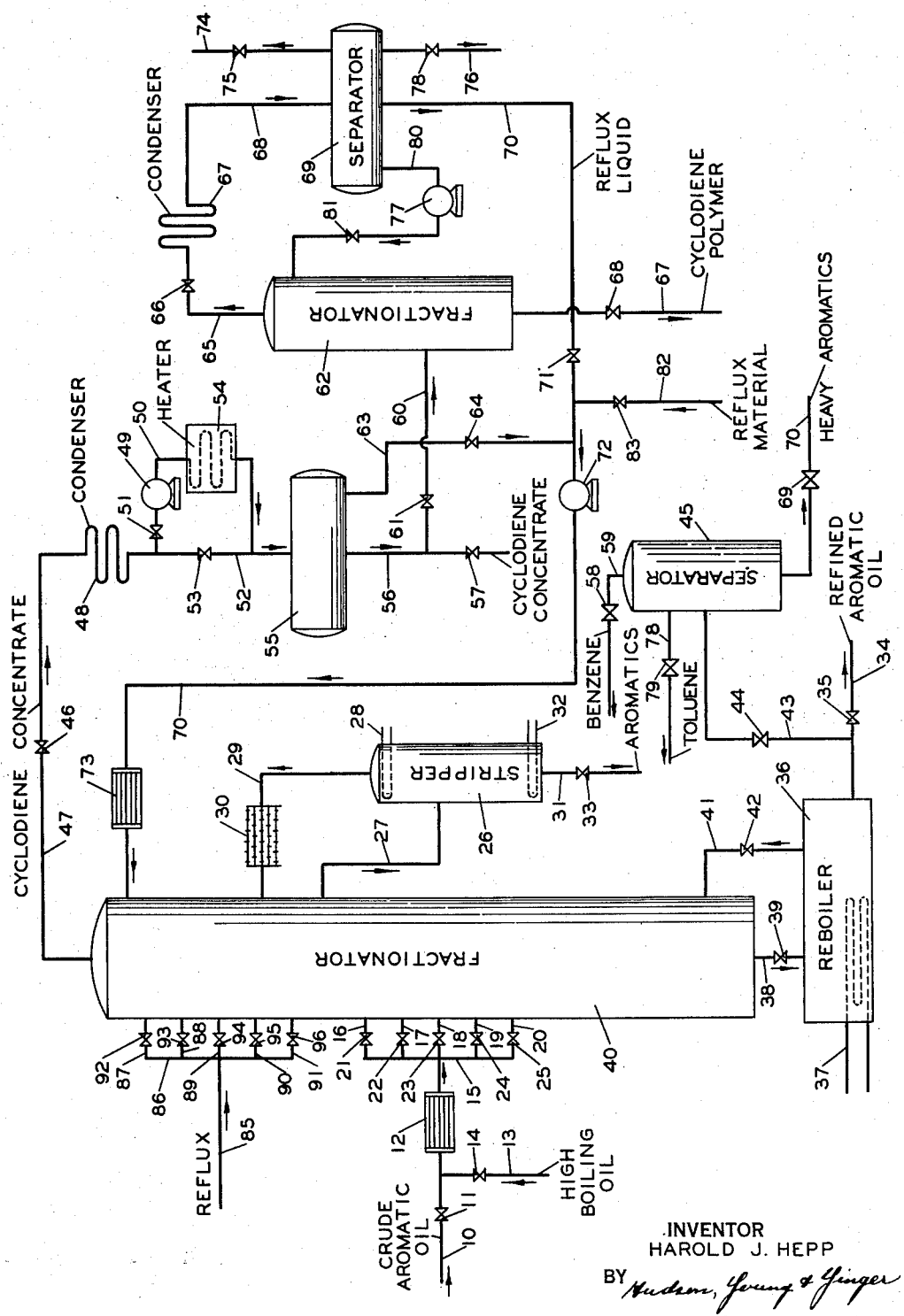

2,387,993

UNITED STATES PATENT OFFICE 2,387,993

REFINING AROMATIC OILS

Harold J. Hepp, Bartlesville, Okla., assignor to Phillips Petroleum Company, a corporation of Delaware Application January 29, 1942, Serial No. 428,789

3 Claims. (Cl. 260—674)

This invention relates to a process for separating certain unsaturated hydrocarbons from aromatic oils containing such unsaturates. More particularly it relates to a process for separating low-boiling cyclodiene hydrocarbons, such as cyclopentadiene and methylcyclopentadiene, from aromatic oils such as benzene, toluene and the like, and hydrocarbon fractions containing such aromatics in substantial amounts. It also relates to securing aromatic hydrocarbons in a state of high purity.

It is a well known fact that either cyclopentadiene or methylcyclopentadiene can be polymerized to produce a high-boiling simple dimer. In some instances cyclopentadiene can be co-polymerized with methylcyclopentadiene to produce a co-dimer. However, at any given temperature and concentration of cyclodiene there is an equilibrium between the amount of monomer and dimer present, and when, after equilibrium is attained for any such system, the temperature is increased or the concentration of said cyclodiene lowered, the amount of monomer in such a system is increased and a new equilibrium is established.

Such behavior gives rise to difficulty when conventional fractional distillation means are employed, such as a fractionating column, to separate these monomers from aromatic hydrocarbons, such as benzene, toluene, and the like, since some polymerization and, specifically, dimerization occurs whereupon resultant dimers and any higher boiling polymers remain in the distillation column after the substances boiling below benzene have been removed. Such polymeric material slowly decomposes due to the decreased concentration of the monomer and the increased column temperature with the result that the desired hydrocarbon, such as benzene, and subsequent fractions are contaminated with the monomer thus formed.

The kinetics of the polymerization of cyclopentadiene and the depolymerization of the polymers formed by such polymerization has been studied by a number of investigators, notably Harkness, Kistiakowsky, and Mears, J. Chem. Phys. 5, 682 (1937) and Wassermann and coworkers, J. Chem. Soc. 1939, 362, 367, 371, 375, 735, and 870. These workers have shown that the polymerization of cyclopentadiene is a bimolecular reaction and that the rate of polymerization increases with increasing temperature and with increasing concentration of cyclopentadiene. The relation between temperature and the reaction velocity constant is defined by the equation:

$$\log k_2 = 6.3 - \frac{3647}{T}$$

where T is temperature in degrees Kelvin, and $k_2$ is the reaction velocity constant in liter mole$^{-1}$ second$^{-1}$ units.

At a given temperature the relation between initial concentration of cyclopentadiene and the amount of cyclopentadiene converted to dicyclopentadiene during an interval of time is given by the following equation:

$$k_2 = \frac{1}{t} \cdot \frac{x}{a(a-x)}$$

where $k_2$ is the reaction velocity constant, $t$ is the reaction time in seconds, $a$ is the initial concentration of cyclopentadiene in moles per liter, and $x$ is the amount of cyclopentadiene in moles per liter that have reacted in time $t$.

Similarly, these authors have shown that dicyclopentadiene decomposes to form cyclopentadiene. In this case the depolymerization reaction appears to be unimolecular and the rate of depolymerization increases with increasing temperature but is independent of the concentration of dicyclopentadiene present at any given time during the depolymerization.

The relation between temperature and the reaction velocity constant for the depolymerization of dicyclopentadiene is expressed by the equation:

$$\log k_1 = 13.3011 - \frac{7588}{T}$$

where $k_1$ is the unimolecular reaction velocity constant, expressed in the unit liter mole$^{-1}$ second$^{-1}$, and T is temperature in degrees Kelvin.

At a given temperature the relation between initial concentration of dicyclopentadiene and the amount of dicyclopentadiene converted to monomer during an interval of time is given by the following equation:

$$k_1 = \frac{2.303}{t} \log \frac{a}{a-x}$$

where $k_1$ is the reaction velocity constant, $t$ is the reaction time in seconds, $a$ is the initial concentration of dicyclopentadiene in moles per liter, and $x$ is the amount of dicyclopentadiene in moles per liter that have reacted in time $t$.

Under a given set of conditions both the polymerization and depolymerization reactions occur simultaneously, and if the time of reaction is sufficiently prolonged an equilibrium will be established between the cyclopentadiene and the dicyclopentadiene present.

The equilibrium concentrations of monomer and dimer may be estimated from the following equation:

$$K_c = (A-B)/2B^2$$

where $K_c$ is the equilibrium constant which is defined as equal to $$\frac{k_2}{k_1}$$

and

A represents the initial concentration in moles per liter of monomer plus twice the concentration in moles per liter of any dimer initially present, and B represents the concentration in moles per liter of monomer which exists at equilibrium.

Various methods are known to the art for removing such substances as cyclopentadiene and methylcyclopentadiene from mixtures containing them. Polymerization of such substances to higher boiling material may be effected by treating such mixtures with sulfuric acid, aluminum chloride, fuller's earth, and the like. However, such treatment generally also destroys any open-chain diolefins which may be present in said mixtures, such as butadiene or isoprene, and the like, thereby excluding the possibility of the recovery of said open-chain diolefins when such recovery is desirable. A method which has been proposed to avoid the destruction of open-chain diolefins when removing cyclodienes from a mixture containing both types of constituents is to treat such a mixture by heating it in a closed container to about 212° F. for a period of about 18 hours whereupon nearly all of the monomeric cyclodienes, such as cyclopentadiene and/or methylcyclopentadiene, are converted to high-boiling polymers, chiefly the dimer form. Such high-boiling polymers are separated from low-boiling unreacted material in the reaction mixture by means of distillation at pressures low enough so that there is no decomposition of cyclodiene polymers contained therein. However, dicyclopentadiene depolymerizes to contaminate higher boiling hydrocarbon fractions when the latter are distilled from the residue of such an operation. I have found that heat polymerizable cyclodienes, such as cyclopentadiene and/or methylcyclopentadiene, can be removed as such, that is, as the monomer, from higher boiling crude aromatic oils containing them, even when such oils contain a substantial portion of the dimer form of said cyclodienes.

My invention comprises separating heat polymerizable cyclodienes and/or the dimers of said cyclodienes, such as specifically disclosed herein, from a hydrocarbon mixture containing these substances by distillation of such a mixture in a fractionating column wherein the temperature in a low zone of the column is maintained at a relatively high value so that a dimer of such cyclodienes is decomposed at a substantial rate in said lower zone, and maintaining the concentration and temperature of such cyclodiene monomer in an upper zone of the column at a relatively low value so that polymerization of said cyclodiene monomer occurs to only a minor extent in said fractionating column. To accomplish this it is necessary to operate the fractionating column under conditions such that there is a greater temperature differential between the kettle and the top than is usual in such equipment for cyclodiene-free materials of otherwise similar composition, and also, in a preferred form, so that there is a much steeper temperature gradient in a particular portion of the column than is usually employed, as will be more thoroughly discussed hereinafter.

One object of my invention is to remove heat polymerizable cyclodienes and/or dimers of such cyclodienes from aromatic oils.

Another object of my invention is to remove cyclopentadiene and/or methylcyclopentadiene from crude aromatic oils and subsequently recovering said cyclo compounds and/or refined aromatic oils.

Another object is to prepare in an economical manner aromatic oils substantially free from heat polymerizable cyclodienes and/or dimers of such cyclodienes.

Still another object of my invention is to separate heat polymerizable cyclodienes and/or high-boiling polymers of such cyclodienes from hydrocarbon mixtures containing these substances.

Further objects and advantages of my invention can be ascertained by one skilled in the art from the accompanying disclosure and discussion.

My process will now be more fully described by reference to the drawing, although it is not my intention to limit the invention unnecessarily to the particular apparatus described. For example, crude aromatic oils containing cyclopentadiene, benzene, and higher boiling substances enter fractionating column 40 by means of conduit 10 controlled by valve 11, the point of entry depending upon the composition of the entering stream and being adjusted by means of manifold 15 and conduits 16, 17, 18, 19, and 20 controlled by valves 21, 22, 23, 24, and 25, respectively. When the charge stock contains relatively large amounts of low-boiling material it is preferably introduced at a higher point of the column than when the charge stock contains relatively large amounts of higher boiling material. When the material entering through conduit 10 is deficient in high-boiling substances, a high-boiling oil, such as a high-boiling mineral oil, which is stable at the temperatures employed, is preferably admitted to the column in admixture with the material entering through conduit 10. This may be accomplished by means of conduit 13 controlled by valve 14. One modification of my invention in connection with the feed to the column is that hexanes may be added to the crude aromatic oils charged to column 40 in addition to said high-boiling oils. Such hexanes are separated inside stripping column 26 whose operation is discussed herein. By employing this modification, material removed from reboiler 36 through conduit 34 will contain substantial amounts of benzene as well as heavier products.

The feed stream to column 40 is heated to a temperature in the range of about 200 to 500° F. and preferably between 300 and 400° F. by means of the heat exchanger 12. The pressure on the feed stream is maintained in the range between atmospheric pressure and 250 pounds per square inch gauge and preferably between about 25 and 150 pounds per square inch gauge, depending upon the concentration of cyclopentadiene and the like, and the amount of high-boiling substances present in the feed stream. As the concentration of cyclopentadiene and the like increases and/or as the amount of high-boiling substances in the feed stream increases, the pressure on the feed stream is maintained in the lower part of the preferred range indicated. When the concentration of cyclopentadiene is high and the pressures in the column are in the upper portion of the pressure range at temperatures between 300 and 400° F. the rate of polymerization of the cyclopentadiene is very high.

Fractionating column 40 preferably operates at a pressure of 25 to 150 pounds per square inch gauge, the selected pressure and feed composition being adjusted to maintain a temperature in the reboiler 36 in the range of 300 to 600° F. but preferably in the range between 350 and 500° F. The size of the lower part of the column, and the reboiler, are adjusted with refernece to the volume of reflux liquid in the column and the rate of withdrawal of kettle product through conduit 34 controlled by valve 35, to provide for a time of residence of high-boiling polymers at temperatures in the range of 350 to 500° F. of between about 0.5 and 5 hours. Under these conditions virtually all of the cyclopentadiene and methylcyclopentadiene dimers are converted into monomers which escape into the column through conduit 41 and valve 42. When the side stripping column 26, subsequently discussed, is employed in my process the material leaving the reboiler through conduit 34 and valve 35 generally contains some benzene, and also comprises a relatively large amount of material boiling at a higher temperature than benzene. This hot stream is preferably passed through heat exchanger 12 by means not shown in the drawing to furnish at least a portion of the heat required to heat the charge stock to the column. When the stripping column 26 is not employed in my process by closing a valve in conduit 27 not shown in the drawing, essentially all C₆ and higher boiling material are passed through conduit 34. Such C₆ and higher boiling material may be removed from my process through valve 35. However, I prefer to pass at least a part of such C₆ and higher boiling material through conduit 43 controlled by valve 44 to separating means such as fractionator 45. From fractionator 45 a refined light aromatic hydrocarbon fraction containing essentially benzene is removed through conduit 59 controlled by valve 58. A refined middle aromatic hydrocarbon fraction containing essentially toluene may be removed through conduit 78 controlled by valve 79 and a heavy hydrocarbon fraction containing essentially aromatic oils having a higher boiling point than toluene is removed from my process through conduit 70 controlled by valve 69. When desirable a portion of the heavier aromatic material removed through conduit 70 may be passed back to column 40 by means of conduit 13 in admixture with high-boiling oil charged through conduit 13 and/or as material to supplement at least a part of said high-boiling oil.

Overhead material from column 40, will comprise substantially hydrocarbons having a boiling range below the boiling point of benzene, and passes through conduit 47 controlled by valve 46 to cooler 48 wherein at least a portion of such material is preferably liquefied. Such hydrocarbons may be passed directly to tank 55 by means of conduit 52 controlled by valve 53 and when desired can be removed from the system through conduit 56 controlled by valve 57.

When it is desirable to recover a cyclodiene as a substantially pure product from my process, it is preferable to polymerize at least a portion of the cyclodienes contained in the overhead material from column 40 charged to tank 55, the temperature and pressure conditions of the material in tank 55 being adjusted accordingly. This may be done by passing such material from cooler 48 through valve 51, pump 49, and heater 54 in conduit 50 when valve 53 is wholly or partly closed. Conditions are so adjusted that nearly complete polymerization of heat polymerizable cyclodienes, such as cyclopentadiene and methylcyclopentadiene, readily occurs both in tank 55 and between heater 54 and tank 55. Such material in tank 55 passes through conduits 56 and 60 controlled by valve 61 to fractionator 62 wherein polymers are separated from unreacted hydrocarbons. In fractionator 62 the temperature and pressure are preferably maintained at relatively low levels during the separation, thereby avoiding substantial depolymerization of polymers. Polymers are removed from fractionator 62 through conduit 67 controlled by valve 68. Unreacted hydrocarbons pass through conduit 65 controlled by valve 66 to cooler 67 wherein at least a portion is preferably liquefied. Such cooled material passes through conduit 68 to separator 69 from which nonliquefied material may be removed through conduit 74 controlled by valve 75. Liquefied material which is substantially free of heat polymerizable cyclodienes may be removed from separator 69 and from the system through conduit 76 controlled by valve 78. However, a portion of such liquefied material is preferably returned to fractionator 62 by means of pump 77 in conduit 80 controlled by valve 81 and employed as reflux liquid in said fractionator, and another portion of such liquefied material is preferably passed from separator 69 through conduit 70 and valve 71 by means of pump 72 to fractionating column 40 to be used therein also as reflux liquid. The temperature of the stream thus passing to column 40 is adjusted by means of heat exchanger 73 in conduit 70 to assist in providing an optimum temperature in the upper part of column 40.

In some instances it may be desirable to pass to the top of fractionating column 40 a reflux liquid which contains heat polymerizable cyclodienes, such as cyclopentadiene. This can be done according to my process by passing unpolymerized liquefied material from tank 55 through conduit 63 controlled by valve 64 to conduit 70 and thence to fractionating column 40 by means of pump 72 and through heat exchanger 73. When tank 55 contains essentially polymerized cyclodienes, at least a portion of said unpolymerized material can be passed from conduit 47 in the liquid phase to an accumulator, not shown in the drawing and thence to conduit 70 by means also not shown.

In other instances it will be more desirable to supply reflux to column 40 from an outside source. Such material may comprise propane, butanes, pentanes, hexanes, and the like, or mixtures of these and can be introduced to column 40 by means of conduit 82 controlled by valve 83 and thence through conduit 70 as discussed. However, such material, when employed in my process, is preferably introduced to column 40 at selected points, usually above the tray at which crude aromatic oil charge stock to the column enters but not necessarily so, such as through conduit 85 and manifold 86 to any one or combination of conduits 87, 88, 89, 90, and 91 controlled by valves 92, 93, 94, 95 and 96, respectively, with an object of reducing the concentration of cyclodienes being separated therein and a further object of producing a sharp lowering of temperature in the upper part of the column. Also, the use of the more volatile substances in such a manner permits operating the column at higher pressures, when such operation is desirable, thereby reducing the amount of high-boiling oil that usually needs to be added through conduit 13 in order to maintain relatively high reboiler temperatures.

The stripping column 26 embodies a preferred feature in operating my process. Column 26 takes feed through conduit 27 from a plate high enough above the crude aromatic oil entry tray of column 40 so that said feed contains only minor amounts of substances higher boiling than benzene. The cooling coil 28 provides reflux for stripping column 26. Low-boiling material from stripping column 26, comprising largely $C_5$ and some benzene, passes through conduit 29 to cooler 30 where it may be further cooled and if desired, completely liquefied, and then passes to column 40, the point of entry being one or more trays above the tray from which feed for column 26 is being drawn, preferably about three trays above. In stripping column 26, benzene and any heavier hydrocarbons, the latter being present in only small amounts, are withdrawn through conduit 31 controlled by valve 33. Heating coil 32 is provided to supply heat for reboiling in column 26. When it is desired to further purify at least a portion or all of the aromatic hydrocarbon from stripping column 26, said fraction may be passed by means not shown to fractionator 45 from which a benzene fraction and/or a toluene fraction may be separated as previously discussed herein.

The side stripping column 26 assists in minimizing the concentration of cyclopentadiene in that section of column 40 located below the entry point of the crude aromatic oils thereto, where conditions tend to favor polymerization of cyclopentadiene.

This feature is accomplished by removing through conduit 27 to stripping column 26 a regulated fraction of either the liquid running over the tray at this point, or of the ascending vapor from between trays at this point. This product is composed of substantial amounts of benzene and any other $C_6$ hydrocarbons which may be present in the column at this point of removal along with cyclopentadiene and other $C_5$ hydrocarbons which are also present at this point in relatively high concentration as compared to the concentration of $C_5$ hydrocarbons in that section below the crude aromatics entry tray, and any heavier products which may be present at this point and whose amount depends upon the location of the conduit 27 with respect to the crude aromatics entry tray. By so operating, the section of the column below conduit 27 is largely controlled to effect separation between benzene and toluene. The relatively high temperature thereby caused in the column section below the crude aromatics entry tray ensures that the concentration of $C_5$ material, and particularly cyclopentadiene, is kept at a minimum. In the section of column between the crude aromatics entry tray and conduit 27, the composition of the liquid running over the trays changes from a rather low content of $C_5$'s at the crude aromatics entry tray as determined by the crude aromatics composition, to a moderately high $C_5$ content at the point of entry to stripping column 26, the exact values being determined by the location of conduit 27 with respect to the crude aromatics entry point, and refluxing conditions maintained in column 40.

Such rapid composition change is attended by a corresponding temperature change and thus as the concentration of cyclopentadiene increases, the temperature is reduced, these factors exerting opposite effects on polymerization rate of cyclopentadiene.

The part of the column above the conduit 27 is effecting the separation of benzene and other $C_6$'s and the $C_5$'s; and while the concentration of $C_5$'s including cyclopentadiene is highest in this part of the column, the temperatures existing are relatively low and the corresponding polymerization rate of cyclopentadiene is thus minimized. Some control may be exerted over the concentration of cyclopentadiene in this upper column section by feeding to the upper plates of the column greater or smaller amounts of a cyclopentadiene-free $C_5$ reflux liquid preferably containing considerable amounts of the higher-boiling $C_5$ paraffins and/or olefins as is discussed herein.

Hydrocarbon mixtures containing aromatic hydrocarbons recovered from my process, such as through conduit 31 or through conduit 34, and substantially free from cyclodienes may be further treated, as may appear desirable, to remove simple olefins and/or other material by chemical treatment with sulfuric acid, aluminum chloride, and the like, followed by distillation. Distillation may also be employed where desirable, prior to such chemical treatment.

The following example is given purely for the purpose of illustrating one of the many possible modes of operation of my process; however, it is not necessarily to be taken as establishing limitations of the process.

*Example*

To a crude aromatic oil stream produced by the low pressure pyrolysis of an ethane-propane mixture and flowing at a rate of 5000 gallons per day and under a pressure of 45 pounds per square inch gauge may be added a stream of narrow boiling range mineral oil with an average boiling temperature of 500° F. flowing at the rate of 3100 gallons per day. The composition of such a combined stream is given in the tabulation below. About ½ of the cyclopentadiene and methylcyclopentadiene indicated in said tabulation is present as the dimer.

|  | Gallons | Moles | Vol per cent |
|---|---|---|---|
| Cyclopentadiene | 753 | 73.6 | 9.3 |
| Other $C_5$ hydrocarbons | 1,200 | 102.0 | 14.8 |
| Methylcyclopentadiene | 50 | 4.0 | 0.6 |
| Benzene | 2,228 | 210.0 | 27.5 |
| Toluene | 356 | 27.9 | 4.4 |
| Xylenes and styrene | 155 | 11.2 | 1.9 |
| Heavier aromatics | 258 | 14.4 | 3.2 |
| Mineral oil | 3,100 | 120 | 38.3 |
|  | 8,100 | 563.1 | 100.0 |

This stream is preheated to 350° F. in heat exchanger 12, and introduced into fractionating column 40 at a pressure of 45 pounds per square inch gauge. Column 40 has an efficiency of between about 30 and 40 theoretical plates. During the preheating, vaporization occurs to the extent of approximately 33 per cent on a mole basis. Under these conditions the concentration of cyclopentadiene and methylcyclopentadiene amounts to not more than approximately 0.26 mole per liter at the entry tray.

The temperature of reboiler 36 is maintained at 450° F. The volume of the lower part of the column and reboiler is such that the time of residence of the hydrocarbons at temperatures of 350 to 450° F. is approximately 2 hours. At a temperature of 350° F. cyclopentadiene dimer is decomposed into monomer to the extent of 90 per cent in 2½ hours, while at 450° F. this decomposition requires only 2 minutes.

Immediately above the entry tray for aromatic oils the temperature drops rapidly to 225° F. on the tray from which liquid is drawn into the side stripping column 26. The stream into the stripper consists roughly of 50% C₅'s and 50% benzene. The C₅ hydrocarbons plus about ⅓ to ½ of the benzene is taken overhead from the stripper through conduit 29, cooled to 220° F. in cooler 30 to condense the vapors, and returned to column 40 as reflux at a position which is three trays above the one from which liquid is drawn into column 26.

The concentration of cyclopentadiene and the like in the section of column between the aromatic oil entry tray and the return stream from the side stripper 26 amounts roughly to 0.1 mole per liter. Ten to fifteen per cent of this monomer polymerizes and most of the polymer passes down the column into the hot zone and is there decomposed.

Above the point of entry of the overhead product from side stripper 26 into column 40, the concentration of cyclopentadiene gradually increases until, on the top tray with a C₅ reflux return through pipe 70 of 10,000 gallons per day, it attains a value of approximately 0.5 mole per liter. The temperature at this point is approximately 190° F. Approximately 10 per cent of the monomer present polymerizes in the column section between the point of entry of the overhead product from side stripper 26 into column 40 and the top tray. This can be reduced, if desired, by returning a larger volume of reflux to column 40 through pipe 70. Such polymers pass down the column to the hot zone and are there decomposed, except that about ¼ of such polymers enter the side stripper 26 and are recovered with the benzene from this stripper.

The overhead product from column 40 is cooled to approximately 180° F. in cooler 48 and stored in tank 55 for a period of 15 hours at this temperature to cause polymerization. As an alternate manner of operating, at least a portion of the stream leaving cooler 48 may be passed to pump 49 and heat exchanger 54 where its temperature is raised to 250–300° F., and then stored in tank 55 at a pressure of 150 to 200 pounds per square inch gauge. Under these conditions storage time is reduced to 1 to 2 hours.

Such a product from tank 55 is passed to fractionator 62 where unreacted material is separated from polymeric material. A pressure of approximately 5 pounds per square inch gauge is maintained in the fractionator, the temperature at the top being 120° F. The kettle temperature is not allowed to rise above 140° F., some C₅ being retained in the polymer withdrawn from the bottom of the column. The overhead product is liquefied in cooler 67 and may be stored in tank 69. A portion of this product is returned to column 40 as reflux through pipe 70, the temperature being adjusted in heat exchanger 73.

Hydrocarbon material removed from the reboiler 36 through conduit 34, essentially free from heat polymerizable cyclodienes and depolymerizable polymeric cyclodienes, and containing C₆ and higher boiling aromatic hydrocarbons is passed through conduit 43 and valve 44 to separator 45. A light aromatic hydrocarbon fraction containing essentially benzene is removed from my process through conduit 59 controlled by valve 58 and a higher boiling aromatic hydrocarbon fraction containing essentially toluene is removed from my process as a side stream from separator 45 through conduit 79 controlled by valve 78. A heavy aromatic hydrocarbon fraction containing essentially xylenes, styrenes, heavier aromatics, and mineral oil such as charged through conduit 13 is removed through conduit 70 controlled by valve 69. This heavier fraction may be subjected to further treatment as may appear desirable to one skilled in the art. In particular, mineral oil separated from said heavier fraction is returned to the process, at least in part, through conduit 13.

In view of the many possible modifications of my process, which will be obvious to those skilled in the art, the invention should not be limited unduly by the foregoing specification and example, but it should be understood to be extensive in spirit and equivalents within the scope of the claims.

I claim:

1. The process of separating aromatic hydrocarbons essentially free from cyclopentadiene and methylcyclopentadiene and dimers thereof from crude aromatic oils containing said aromatic hydrocarbons and cyclopentadiene and methylcyclopentadiene and simultaneously separately recovering monomeric cyclopentadiene and methylcyclopentadiene therefrom which comprises continuously passing said crude aromatic oil into a fractionating column the kettle of which is provided with a reboiler, effecting said introduction at a mid-point of said column, maintaining the kettle of said column at a temperature of 350 to 500° F. by means of said reboiler, subjecting material flowing downwardly in said column and comprising dimers of cyclopentadiene and methylcyclopentadiene to temperatures of 350 to 500° F. in the lower part of said column for a period of time of between 0.5 and 5 hours and thereby converting all of said dimers to monomers, passing dimer-free material containing monomeric cyclopentadiene and methylcyclopentadiene upwardly in said column, operating said column at a pressure of 25 to 150 pounds per square inch gauge, maintaining the concentration of monomeric cyclopentadiene and methylcyclopentadiene and the temperature in the upper part of said column such as to substantially preclude dimerization of said monomeric material therein, refluxing the top of said column, withdrawing from the column at a point well below the top thereof at least one fraction containing the aromatic hydrocarbons of the feed and essentially free from cyclopentadiene and methylcyclopentadiene and dimers thereof, withdrawing as the overhead from said column an overhead fraction consisting essentially of hydrocarbons boiling below benzene and comprising monomeric cyclopentadiene and methylcyclopentadiene in amount essentially corresponding to the content thereof both as monomer and dimer in the original crude aromatic oil.

2. The process of claim 1 including the further step of introducing high-boiling oil stable at the temperatures employed in admixture with said aromatic oil fed to the column and thereby offsetting any deficiency of said aromatic oil in high-boiling substances and thereby assisting in maintaining the temperature in the kettle of said column at 350 to 500° F.

3. The process of claim 1 including the further steps of withdrawing a side stream from said column at a point sufficiently above said point of feed introduction that said side stream contains only minor amounts of substances higher boiling than benzene, passing said side stream to a stripping column, therein stripping hydrocarbons lower boiling than benzene from benzene and any heavier hydrocarbons, condensing said stripped hydrocarbons lower boiling than benzene and introducing the liquid condensate to the main column at a point substantially above said point at which said side stream is withdrawn, and removing from said stripping column a stripped heavy fraction comprising benzene and any heavier hydrocarbons and free from cyclopentadiene and methyl cyclopentadiene, and thereby minimizing the concentration of cyclopentadiene and methylcyclopentadiene in said column below said point of feed introduction, and maintaining both a much steeper downward temperature gradient and a much greater increase in concentration of $C_5$ hydrocarbons between said point of feed introduction and said point at which said side stream is withdrawn than would normally prevail.

HAROLD J. HEPP.